(12) United States Patent
Tanabata et al.

(10) Patent No.: US 6,937,321 B2
(45) Date of Patent: *Aug. 30, 2005

(54) DISTANCE MEASURING METHOD AND IMAGE INPUT DEVICE WITH DISTANCE MEASURING FUNCTION

(75) Inventors: Takanari Tanabata, Ishioka (JP); Keisuke Nakashima, Hitachi (JP); Yoshiharu Konishi, Owariasahi (JP); Takashi Matsuyama, Kyoto (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/795,990

(22) Filed: Mar. 10, 2004

(65) Prior Publication Data

US 2004/0174516 A1 Sep. 9, 2004

Related U.S. Application Data

(63) Continuation of application No. 10/163,572, filed on Jun. 7, 2002, now Pat. No. 6,738,131.

(30) Foreign Application Priority Data

Jun. 18, 2001 (JP) ........................................ 2001-183659

(51) Int. Cl.[7] .............................. G01C 3/08; G01C 3/00
(52) U.S. Cl. ..................... 356/4.04; 356/3.13; 356/4.01
(58) Field of Search ............................... 356/4.01, 4.04, 356/3.13–3.16; 396/61, 65, 80, 104, 204

(56) References Cited

U.S. PATENT DOCUMENTS 3,617,128 A  11/1971  Harvey
4,341,447 A  * 7/1982  Biber ......................... 396/116
4,391,513 A  7/1983  Fujiki
4,441,810 A  4/1984  Momose et al.
4,698,493 A  10/1987  Fried
5,131,740 A  * 7/1992  Maekawa ................... 356/3.14
5,488,471 A  1/1996  McClenahan et al.

FOREIGN PATENT DOCUMENTS

JP          2963990         8/1998

OTHER PUBLICATIONS

U.S. Appl. No. 09/409,223, filed Sep. 30, 1999, Nakashima et al.

Hiura et al., "Depth Measurement by the Multi–Focus Camera," *IEEE Computer Society Conference on Computer Vision and Pattern Recognition Proceedings*, pp. 953–959, Jun. 23–25, 1998.

* cited by examiner

*Primary Examiner*—Bernarr E. Gregory
*Assistant Examiner*—Isam Alsomiri
(74) *Attorney, Agent, or Firm*—Antonelli, Terry, Stout & Kraus, LLP

(57) ABSTRACT

A distance measuring technology capable of stably and accurately performing distance measurement of an object without any highly accurate focus control mechanism is provided. A distance measuring apparatus has a mask for restricting light so as to pass through two or more different light passing positions; a lens system for focusing the light passed through the mask; an image taking-in means for taking in images from the light focused by the lens system; and a distance calculating means for calculating a distance from an imaging element to an object using the taken-in images. The mask restricts the light so as to pass through only specified positions.

10 Claims, 12 Drawing Sheets

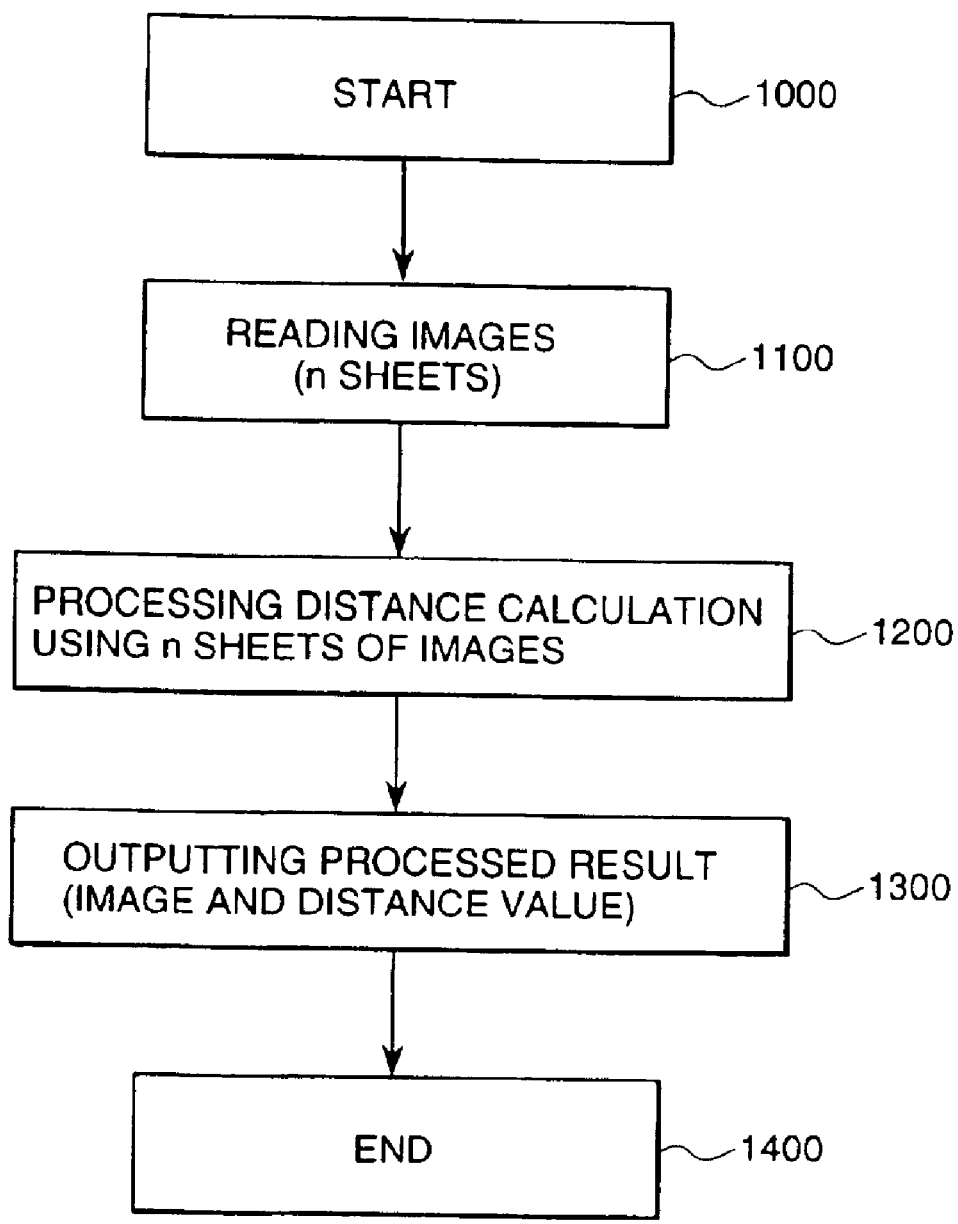

//DISTANCE MEASURING METHOD AND IMAGE INPUT DEVICE WITH DISTANCE MEASURING FUNCTION

CROSS-REFERENCE TO RELATED APPLICATIONS

This is a continuation of U.S application Ser. No. 10/163,572 filed 7 Jun. 2002, now U.S. Pat. No. 6,738,131, the contents of which is incorporated herein by reference in its entirety.

BACKGROUND OF THE INVENTION

The present invention relates to a technology that is used for optically measuring a distance; and, more particularly, the invention relates to a distance measuring apparatus and an image input apparatus.

In order to obtain information concerning a three-dimensional shape and a position of an object in an image from the image taken by a camera, apparatuses for measuring the distance from the camera to each point in the image have been proposed and are commercially available.

As one of the methods of determining a distance using an image, various techniques have been proposed for measuring a distance using a relation between blur, caused by a positional relation between a lens and an imaging plane, and the distance to a camera target. As an example, some methods have been proposed which use a relation between various magnitudes of blur and distances, instead of directly obtaining an in-focus position of the lens. Among these methods, a method proposed by Professor Nayar of Columbia University uses a tele-centric optical system and a double focus camera. Further, in a technique disclosed in Japanese Patent No.2963990, it is proposed to use a structured coded opening (pupil) in order to make analysis of the blur easy.

As pointed out in Japanese Patent No.2963990, the method proposed by Nayar requires a modeling of the lens aberration, a precise positioning of the CCD (charge-coupled device) and removing of noise from an obtained image, because the method uses a simple circular opening lens. Further, it is difficult to measure an object located at a long distant position and to secure depth accuracy because the magnitude of the blur is limited to a comparatively small value.

On the other hand, in the method proposed by Japanese Patent No.2963990, a pupil-shaped light passing means for transmitting light is used so as to make an analysis of the magnitude of the blur easy. Thereby, it is possible to perform distance measurement without the occurrence of any problems in the above-mentioned method of Nayar.

In each of the above-mentioned methods, a distance measurement is performed by analyzing blurs in images taken at different focuses. As the means for taking the images at the different focuses, there are proposed a method in which a plurality of different focused images are taken several times by sequentially moving the lens to change the focus and a method in which a plurality of different focused images are taken at one time by dispersing the incident light in n directions using prisms.

In the method which calls for sequentially moving the lens, it is necessary to perform focus control with a high accuracy. On the other hand, in the method which calls for the use of prisms, the amount of light in the observed image at each focus becomes 1/n, because the incident light is divided into n parts. Accordingly, because of the reduced light level, the amount of charge obtained by the CCD is reduced. Therefore, this method is weak in avoiding electron noise, and so it is difficult to improve the measuring accuracy with this method.

As described above, in each of the conventional methods, there is a requirement to provide an operating accuracy of the focus control mechanism in the measurement apparatus that is extremely high. As a result, the satisfaction of the above requirement becomes an important problem for commercially using the measurement apparatus.

SUMMARY OF THE INVENTION

An object of the present invention is to provide distance measuring technology that is capable of stably and accurately performing distance measurement of an object without the need for a highly accurate focus control mechanism.

In order to achieve this object and solve the above-mentioned problem, a distance measuring apparatus and an image input apparatus using a single-focus camera, without any focus control mechanism, are proposed.

The apparatus comprises a light passing position restricting means that is capable of freely changing the light passing position; a lens system for focusing the light that has passed through the light passing position restricting means; an image taking means for taking in the light focused by the lens system; and a distance calculating means for calculating a distance from an imaging element to an object using the taken-in images.

BRIEF DESCRIPTION OF DRAWINGS

FIG. 5 is a flowchart showing the procedure involving total processing of the distance measurement in the distance measurement apparatus.

DESCRIPTION OF THE PREFERRED EMBODIMENTS

Embodiments of the present invention will be described below with reference to the accompanying drawings. An example of an image input apparatus having a distance measurement function will be described as a first embodiment. In this example, an image input apparatus using a distance measurement function, a distance measurement method and a distance measurement apparatus can be realized. Further, an application of the image input apparatus having the distance measurement function will be described as a second embodiment. It is to be understood that the present invention is not limited to the embodiments to be described herein.

Figure 1:
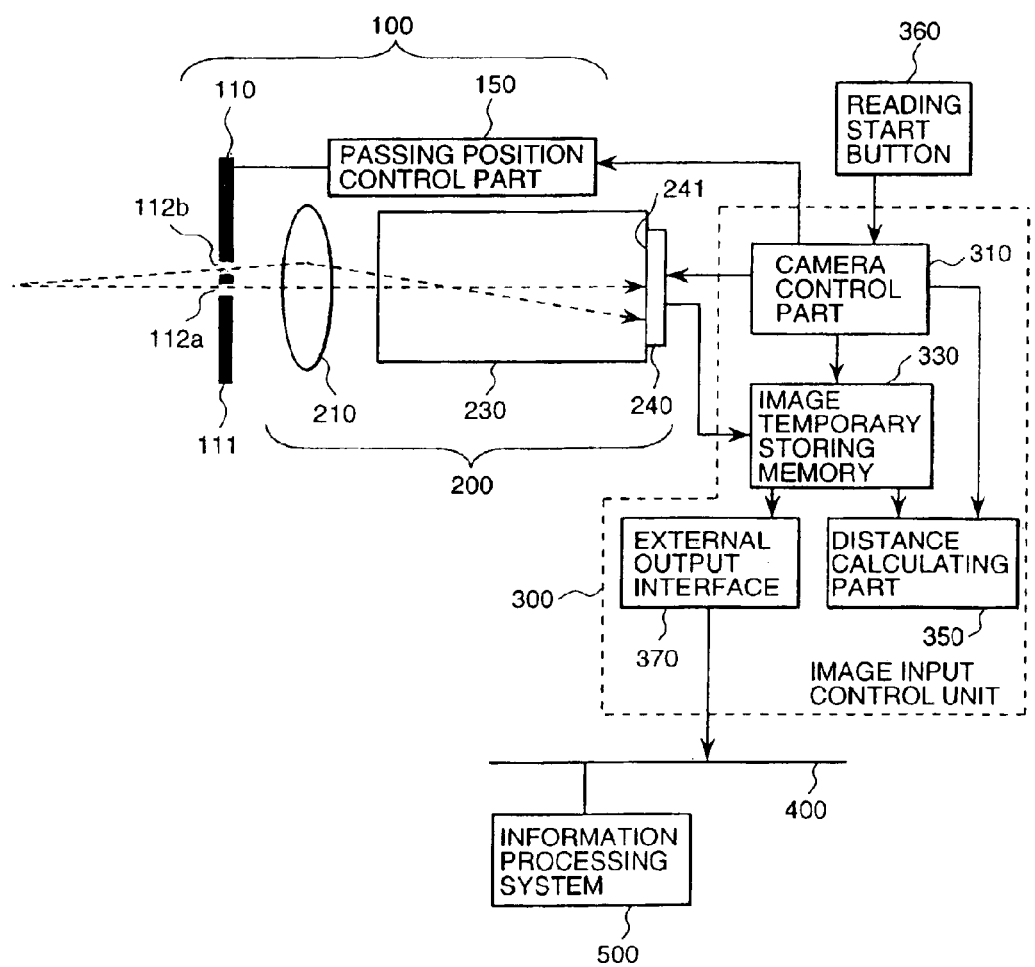
FIG. 1 is a block diagram showing a first embodiment of an image input apparatus having a distance measurement function in accordance with the present invention.

FIG. 1 is a block diagram showing a first embodiment of an image input apparatus having a distance measurement function in accordance with the present invention. The image input apparatus shown in FIG. 1 comprises a light passing position restricting unit 100; a camera 200 having an imaging function; and an image input control unit 300 for performing distance measurement processing based on an image imaged by the camera 200. The image input control unit 300 can be connected to an external unit, such as an information processing system 500, through an information transmission medium 400. As an external unit, for example, a display unit, a print unit, a memory unit, a communication unit or the like may be provided, in addition to the information processing system 500.

The camera 200 comprises a lens system 210 for imaging an image of an object; a camera main body 230; and a CCD 240 in the form of an imaging element serving as a means for taking in the image of the object, the CCD 240 being arranged in the camera main body 230. Further, it is to be noted that a single focusing camera, not having any focus control mechanism, is used as the camera 200.

The light passing position restricting unit 100 is arranged in front of the camera 200, and it operates as a unit for restricting the position through which light is allowed to pass. It is assumed that the light passing positions include at least one set of different positions. More specifically, the light passing position restricting unit 100 comprises a mask 110 that is capable of allowing a light beam to pass though a specified position; and a light passing position control part 150 for selectively changing the light passing position. The mask 110 has opening parts 112a and 112b at specified positions, and it has a masking part 111 for blocking the light in the part other than the opening parts 112a and 112b. Although FIG. 1 shows that both of the opening parts 112a and 112b are in open states, the opening parts 112a and 112b may be opened selectively at different timings. The light passing position control part 150 performs control for selecting which opening part is opened to allow light to pass therethrough.

Therein, the reason why a construction is employed in which the light is allowed to pass through the opening parts 112a and 112b at different timings is to make it easy to determine through which opening part, 112a or 112b, the image is being projected on the imaging plane 241 of the CCD 240. Therefore, if it is possible to otherwise determine through which opening part 112a or 112b, the image is being projected on the imaging plane 241 of the CCD 240, a displacement may be detected using the images projected through the opening parts 112a and 112b at the same time. Accordingly, a mask 110 having a set including both of the opening parts 112a and 112b may be used. In this case, the light passing position control part 150 may be eliminated.

FIG. 1 shows a mask 110 having two opening parts 112a and 112b forming a set of different light passing positions. However, the present invention is not limited to a mask of this type. For example, a mask having three or more opening parts may be employed.

The mask 110 may be formed using, for example, a liquid crystal panel or a plurality of shutters. Further, in a case where the lens system 210 is composed of plural lenses, the mask 110 may be placed inside the lens system 210.

Figure 2A:
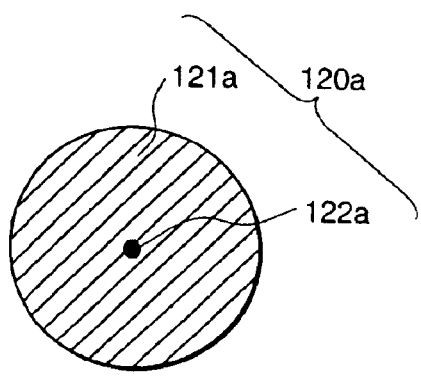
FIG. 2A is a diagram showing an example of a mask used as a light passing restriction member.
Figure 2B:
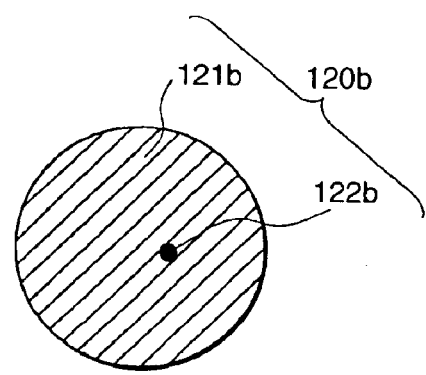
FIG. 2B is a diagram showing another example of a mask having an opening at a different position.
Figure 2C:
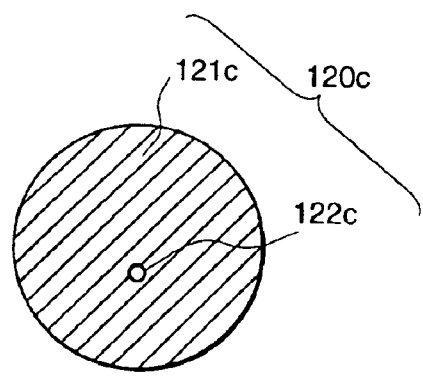
FIG. 2C is a diagram showing still another example of a mask having an opening at a still different position.

Another example of a mask functioning as a member for restricting the light passing position in the light passing position restricting unit is shown in FIG. 2A, FIG. 2B and FIG. 2C. Here, three masks 120a, 120b and 120c are used as one set. The mask 120a shown in FIG. 2A is an example of a mask used for obtaining a reference image ($Img^0$). The mask 120a is composed of a masking part 121a and an opening part 122a positioned near the center. At the time of measuring, the opening part 122a is arranged so that the central axis of the opening part is coaxial with the optical axis. The mask 120b shown in FIG. 2B is an example of a mask used for obtaining a reference image ($Img^1$). The mask 120b is composed of a masking part 121b and an opening part 122b positioned slightly on the right-hand side of the masking part 121b (in the state shown by FIG. 2B). At the time of measuring, the opening part 122b is arranged so that the central axis of the opening part is parallel to the optical axis. The mask 120c shown in FIG. 2C is an example of a mask used for obtaining a reference image ($Img^2$). The mask 120c is composed of a masking part 121c and an opening part 122c positioned slightly on the lower side of the masking part 121c (in the state shown by FIG. 2C). At the time of measuring, the opening part 122c is arranged so that the central axis of the opening part is parallel to the optical axis.

Figure 4A:
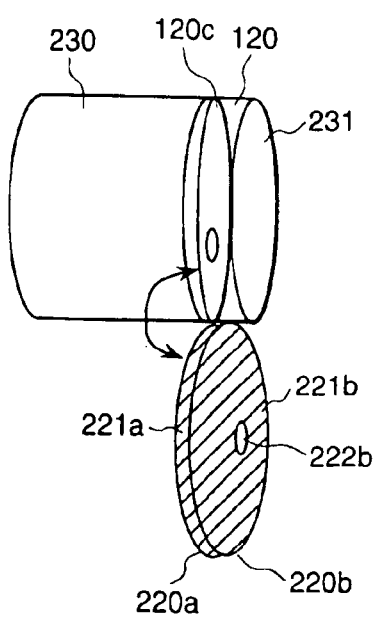
FIG. 4A is a diagram showing an arrangement in which a plurality of masks are selectively mounted.
Figure 4B:
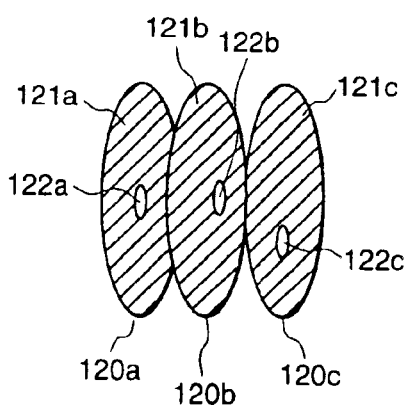
FIG. 4B is a diagram showing that the position of the opening in each of the masks for changing the light passing position is different mask by mask.

FIG. 4B shows a state in which the three masks 120a, 120b and 120c are arranged along the optical axis. As shown in FIG. 4B, the opening parts 122a, 122b and 122c of the three masks 120a, 120b and 120c are disposed at positions different from one another. That is, it is only when one of the masks is used that light can pass through.

By using the mask 120a to determine the common light passing position and by combining the mask 120b or the mask 120c with the mask 120a, the three masks 120a, 120b and 120c form two sets of different light passing positions. By further adding masks having an opening part at a different position, the number of combinations may be increased.

Further, in regard to the positional pattern of the opening parts of the masks 120a, 120b and 120c, the position, the shape of the opening, the size and so on are determined corresponding to an object to be measured and the brightness in the surrounding area. The measuring accuracy is sometimes changed by varying the position, the shape of the opening, the size and so on.

Referring again to FIG. 1, the image input control unit 300 comprises a camera control part 310 for controlling the image taking, the timing of changing the opening shape and the distance calculation processing; an image temporary memory 330 for temporarily storing an image imaged by the CCD 240; a distance calculating part 350 for performing processing for obtaining a distance using the image stored in the image temporary memory 330; an external output interface 370 for outputting information on the obtained image and the obtained distance to the outside; and a reading start button 360 functioning as an input unit for supplying a reading start instruction from a user, the reading start button 360 being connected to the camera control part 310.

Hardware systems which make up the camera control part 310 and the distance calculating part 350 may be provided in the form of common computer, for example, of the type that is composed of a central processing unit (CPU), a read-only memory (ROM), a random access memory (RAM) and so on. Each function of the camera control part 310 and the distance calculating part 350 is performed by executing corresponding software. Of course, each of the camera control part 310 and the distance calculating part 350 may be constructed using separate hardware. For example, the camera control part 310 and the distance calculating part 350 may be constructed of respective logical circuits, such as programmable logic arrays.

The camera control part 310 performs control of the imaging operation of the camera 200, sends an instruction for selecting the mask to the light passing position control part 150 when an instruction for the start of reading is received from the reading start button 360, and sends an instruction for taking in the image to the CCD 240. In addition to these functions, the camera control part 310 sends an instruction for storing the image taken in by the CCD 240 to the image temporary memory 330. In the case where light is made to pass through the opening parts 112a and 112b at different timings, the instruction for image taking and the instruction for image storing are generated at the individual timings. Further, in the case where an image is taken through a plurality of sets of light passing positions, as will be described later, the instruction for image taking and the instruction for image storing are generated for the individual sets of opening parts. However, in a case where there is a light passing position common to the individual sets, the process of taking in the image for the common light passing position may be performed once by taking in an image in common for the individual sets. Further, the camera control part 310 sends an instruction for starting a distance calculation to the distance calculating part 350 after completion of the operation of storing the image in the image temporary memory 330.

The distance calculating part 350 executes a distance calculation using the image stored in the image temporary memory 330. In the distance calculation, a displacement of the image on the imaging plane produced by the different light passing positions is obtained using the stored image. This displacement can be obtained by counting the number of pixels of the displacement of the image while taking any one of the light passing positions as a reference. Therefore, the displacement may be expressed by a number of pixels. The displacement may be expressed by a length dimension using a line density of the pixel.

Therein, for example, the light passing position placed on the optical axis may be used as the reference light passing position. Next, a distance corresponding to the displacement is obtained from the obtained displacement of the image using calibration information. Here, the calibration information can be pre-stored in a memory in the distance calculating part 350, as will described below. For example, the displacement and the corresponding distance may be stored in the form of a table. By storing a calculation equation, the distance may be obtained by substituting the displacement into the calculation equation. In this case, the calculation equation can be written in a program for executing the process of calculating distance and the procedure carried out by inserting the numerical values. Calibration information can be obtained by making light from an object placed at a known distant position pass through the different light passing positions and individually projecting the light on the imaging plane of the imaging element. Then, by changing the distance of the object from the imaging element, it is possible to obtain the displacement on the imaging plane of the image projected through the different light passing positions for each of the distances, and thereby to obtain a one-to-one correspondence relation between the actual measure value of the distance from the imaging element to the object and the corresponding obtained displacement.

Figure 9:
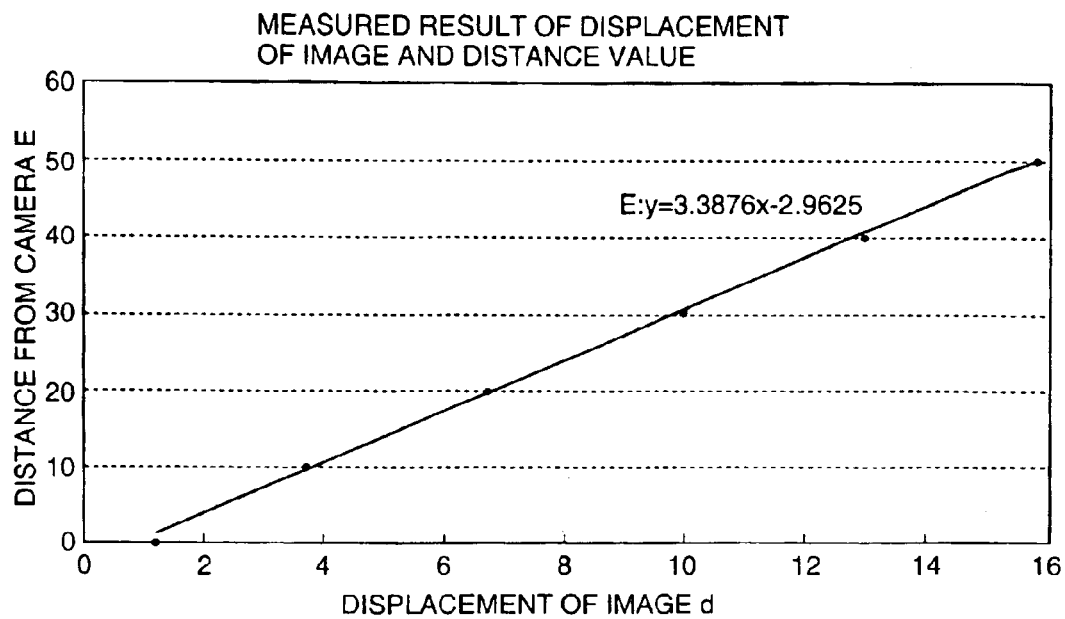
FIG. 9 is a graph showing the measured result of the displacement of an image in relation to the value of distance.

FIG. 9 shows an example of a measured result in obtaining the necessary calibration data. FIG. 9 shows an example of the one-to-one correspondence relation for the calibration data obtained by performing measurement using, for example, the apparatus shown in FIG. 1. More specifically, the distance values are obtained by measuring the distances at plural positions from the camera 200. On the other hand, at each of the positions, the displacements of images imaged on the imaging plane 241 of the CCD 240 by the light beams passing through the different light passing positions are obtained using the masks shown in FIG. 1, FIG. 2A, FIG. 2B and FIG. 2C. After that, the displacement is obtained, for example, as a number of pixels. The above operation is performed at each position from the camera. This measuring method is the same as the procedure used for distance measurement, to be described later, except for the actual measuring of the distance.

Figure 10A:
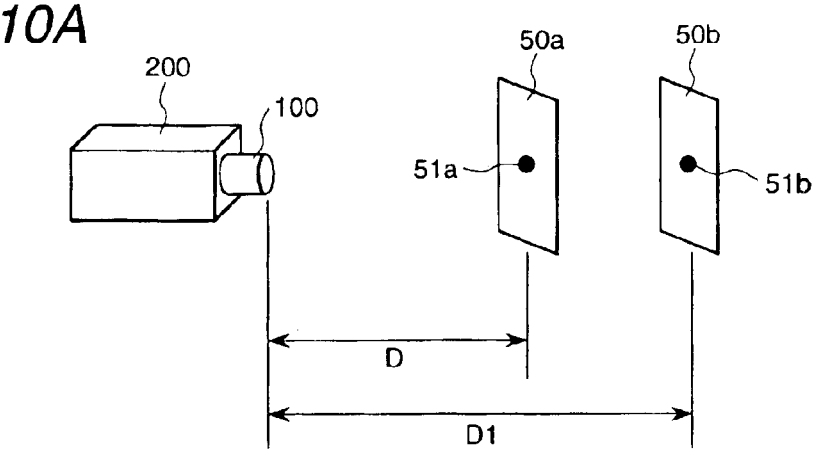
FIG. 10A is a diagram showing that, when a distance calculation equation is calculated, distance measurement is performed using masks having openings in different positions from each other by changing the position of the masks.
Figure 10B:
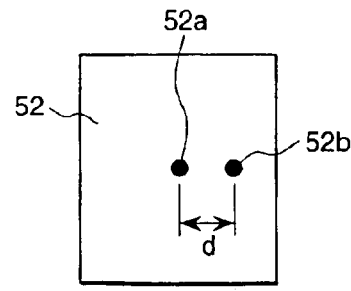
FIG. 10B is a diagram showing the displacement of images formed on an imaging plane by masks having openings in different positions from each other.

In regard to the method of obtaining the conversion equation, an example will be described below. As shown in FIG. 10A, the camera 200 is fixed, and an original 50, serving as an object, is set at a position 50a at a distance D from the position of the lens system of the camera 200. At that time, the lens is focused on the surface of the original. In order to make the measurement simple, it is preferable to use an original 50 having a small black round mark 51 in the center of the original, as shown in FIG. 10A. Keeping this state, the original 50 is set at a position 50a at a distance D1 from the lens system of the camera, and the images are read using masks having opening position patterns of $P_0$ and $P_i$. The obtained images are defined as $Img_0$ and $Img_i$, respectively. When the two images are overlapped, the black round mark images 52a and 52b can be observed at respective imaged positions that are d pixels apart. The pixel amount d can be obtained by the method in which coordinates of the centers of gravity of the two black round marks 52a and 52b observed in the images are calculated. Using the pixel amount d and the distances D and $D_1$ from the original, a distance conversion equation $E_i$ to be employed when measurement is performed using a mask having an opening position pattern $P_i$ can be obtained as follows.

$$E_i = \frac{D1-D}{d}x + D \quad (x: \text{number of pixels}) \quad (1)$$

Measurements of this kind are performed for all the defined patterns $P_i$ (i=1, . . . , n) to obtain the conversion equations for the individual patterns.

By performing the above operation for all the mask patterns $P_i$ (i=1, . . . , n−1), the distance values $d_i$ (i=1, . . . , n−1) are obtained. By evaluating the distance values $d_i$ (i=1, . . . , n−1), a pixel distance value $dist_{x,y}$ is obtained. In regard to the evaluation method, there is, for example, a method in which an average value of distance values $d_i$ (i=1, . . . , n−1) is calculated.

In order to further improve the accuracy, using measured values of displacement obtained by varying the distance for each pattern of the light passing position and the actually measured distance values, an empirical equation is obtained, for example, through the least-squares method. As a result, for example, the following linear equation can be obtained.

$$y = 3.3876x - 2.9625 \quad (2)$$

FIG. 9 is a graph showing an example of a calibration line which expresses the equation (2).

As described above, in the present embodiment, the one-to-one correspondence relation between the distance value and the displacement can be expressed by a linear equation. Therefore, the distance E from the camera 200 can be obtained by substituting the measured displacement into the conversion equation to calculate y. That is, the above equation (2) functions as a conversion equation for converting the displacement into a distance value. In the present embodiment, the procedure for calculation of y using the equation is written as a program. The central processing unit of the distance calculating part 350 executes the program to calculate the distance. As another method, it is possible for the distance values corresponding to a plurality of different displacements to be pre-calculated using the above-mentioned empirical equation and to store the result as a table. This table is stored in a memory contained in the distance calculating part 350. When an obtained displacement is a value falling between two displacements given by the table, the distance may be calculated by executing an interpolating calculation.

In the case of plural sets of different light passing positions, empirical equations are obtained for the individual sets through a procedure similar to that described above. Then, one empirical equation suitable for the purpose is selected from the plurality of obtained empirical equations for use as the conversion equation employed in the distance calculation. Further, in the case of plural sets of different light passing positions, one empirical equation may be determined by the minimum-least squared method using the experimental result obtained by a procedure similar to the above-described procedure.

After completion of the preparation described above, measurement of the distance of an object is performed through use of the procedure described below. The distance measurement apparatus requires that a distance calculating procedure based on the above-described conversion equation or a displacement-distance one-to-one correspondence relation table based on the conversion equation should be prepared.

The result of the distance, that has been calculated as described above, is output to an external unit, such as the information processing system 500 or the like, through the external output interface 370 and the information transmission medium 400. At that time, an image stored in the image temporary memory 330 also may be output. By outputting the distance information together with the image, as described, the image can be corrected based on the distance information. Further, there is an advantage in that three-dimensional image information can be easily synthesized by combining the distance information and the image information. The external output interface 370 can be constructed using a common interface, such as an SCSI, a USB or an IEEE1394, or a wireless communication means, such as Bluetooth.

Distance measurement using the distance measurement apparatus according to the present embodiment will be described below. The distance measurement using the distance measurement apparatus according to the present embodiment is performed by using a plurality of masks, each having a different pattern of the light opening position, which are capable of producing plural different light passing positions. An image of an object is projected to the camera 200 through each of the light opening portions to form an image on the imaging plane 241 of the CCD 240, and the imaged image is taken in as image information. At that time, one image of the object corresponding to each of the different opening positions is taken in. Accordingly, plural images are taken in, and these images are stored in the image temporary memory 330. Then, the distance to the object is calculated by the distance calculating part 350 using the stored images. At that time, one of the taken-in images is defined as a reference image. Then, a displacement is obtained by comparing the reference image with the other remaining images, and a distance value corresponding to the obtained displacement is calculated.

Here, the masks shown in FIG. 2A, FIG. 2B and FIG. 2C are used. That is, description will be made of a case where the mask 120a having the pin-hole shaped opening part 122a, the a position corresponding to the optical center of the lens system, is used for the reference image, and the mask 120b having an opening part of the same size and shape at a position on the right-hand side of the center and the mask 120c having an opening part of the same size and shape at a position in the lower side of the center are used for the images that are different from the reference image. The images taken in through the masks 120a, 120b and 120c are defined as $Img^0$, $Img^1$ and $Img^2$, in this order.

A mask attaching part 231 is arranged in the front end of the lens column of the camera main body 230, and a necessary mask among the three masks 120a, 120b and 120c is selectively mounted in the mask attaching part 321, as shown in FIG. 4A. The selective mounting of the mask can be performed by a mask attaching-and-detaching unit, not shown. The selective mounting by the mask attaching-and-detaching unit is performed based on a control signal from the light passing position control part 150. More specifically, when a control signal identifying a light passing position is output, the mask attaching-and-detaching unit detaches a mounted mask, when the mounted mask is not the mask corresponding to the light passing position expressed by the control signal. Then, the mask attaching-and-detaching unit selects a mask which should be mounted and mounts the mask onto the mask attaching part 231. Further, the mounting of the mask may be carried out manually. In this case, a display unit is connected to the light passing position control part 150, and the display unit is made to show a display identifying a mask to be mounted next by the light passing position control part 150. For example, the mask to be mounted next is indicated by displaying a mask number on the display unit and by displaying a message calling for changing of the mask and the mounting of a new mask on the display unit.

FIG. 5 shows the overall process flow from the image taking-in processing to the distance measuring processing performed by the apparatus in accordance with the present invention. Therein, it is assumed that information defining the relation between the displacement of the image on the imaging plane 241 and the distance of the object has already been obtained and given in advance. Further, the procedure in an experiment for obtaining the conversion equation expressing the relation between the distance and the displacement also will have been performed.

When a user actuates the reading start button 360, the camera control part 310 receives an operation command from the reading start button 360 and selects a mask to be used for taking in an image of the object from the n prepared masks individually having different opening patterns $P_i$ (i=0, ..., n) and sends this information to the light passing position control part 150 (Step 1100). This processing is performed sequentially for the n masks. The processing for taking in the images projected on the imaging plane of the CCD 240 through the opening parts of each of the masks is executed. After that, the distance calculating part 350 executes the distance calculating processing using the n images stored in the image temporary memory 330 (Step 1200). The obtained distance information and the images stored in the image temporary memory 330 are output through the external output interface 370 and the information transmission medium 400 (Step 1300). Thus, a series of distance calculating processes is completed (Step 1400).

In regard to the output format of the distance values, there is a well known type of distance image in which a value of the distance between the camera and the object is input to a pixel value of the taken-in image. This embodiment can produce an output of this type.

Each of the steps of the process will be described in detail below. Here, it is assumed that a number n of opening position patterns (opening shape patterns) of the masks are used for taking in the images ($P_i$ (i=0, ..., n), here i=0 is a pattern for the reference image). Further, it is assumed that the pixel size of the image input by the CCD 240 is HEIGHT pixels in the vertical direction and WIDTH pixels in the horizontal direction, and the coordinate system for the image is (x, y)=(0, 0) at the upper left and (x, y)=(WIDTH, HEIGHT) at the lower right.

Figure 6:
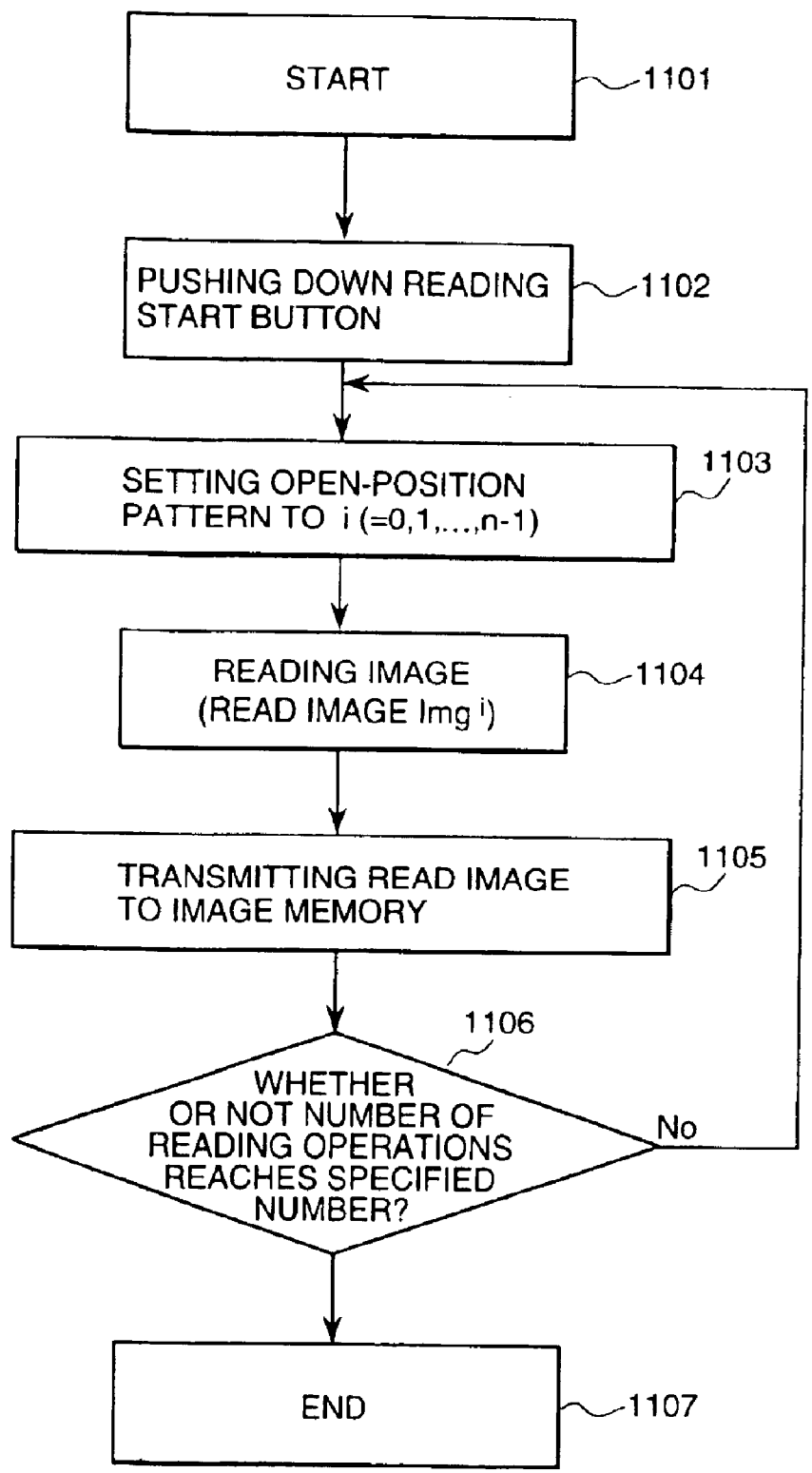
FIG. 6 is a flowchart showing the procedure for image reading processing used in the image input apparatus.

FIG. 6 is a flowchart showing the image read-in processing, which is mainly executed by the camera control part 310.

As the apparatus is started (Step 1101), the camera control part 310 is waiting for actuation of the reading start button 360 by the user. When the user actuates the reading start button 360, the camera control part 310 receives the operation command (Step 1102). The camera control part 310 instructs the light passing position control part 150 to set a specified mask into the front portion of the lens system 210. That is, the camera control part 310 instructs the light passing position control part 150 to initially set the mask having the opening position pattern $P_0$ for the reference image, among the pre-defined opening position patterns, into the front portion of the lens system 210 (Step 1103). After completion of this setting operation, the camera control part 310 instructs the CCD 240 to execute the operation of reading the image, so as to cause the CCD to read the image (Step 1104). The read image is transmitted from the CCD 240 to the image temporary memory 330 to temporarily store the image in the image temporary memory 330 (Step 1105). Therein, the image data is appended with, for example, an index $Img^0$ (Step 1105). This is for providing easy access to the image data.

After that, setting of another mask is similarly performed (Step 1103), reading of the image is performed (Step 1104) and transmission of images to the memory 330 is performed (Step 1105) for all the remaining ones of the n prepared masks. Then, it is checked to determine whether the operation of image reading for each of the masks having an opening pattern corresponding to each of the different opening positions has been completed (Step 1106), and the reading process is completed when the result is affirmative (Step 1107).

At the time when the reading process ends, all the images are stored in the image temporary memory 330. and the images taken in through the individual masks are appended with indexes $Img^i$ (i=0, 1, ..., n−1). After that, the distance calculating process is executed using the indexes $Img^i$ (i=0, 1, ..., n−1).

Figure 7:
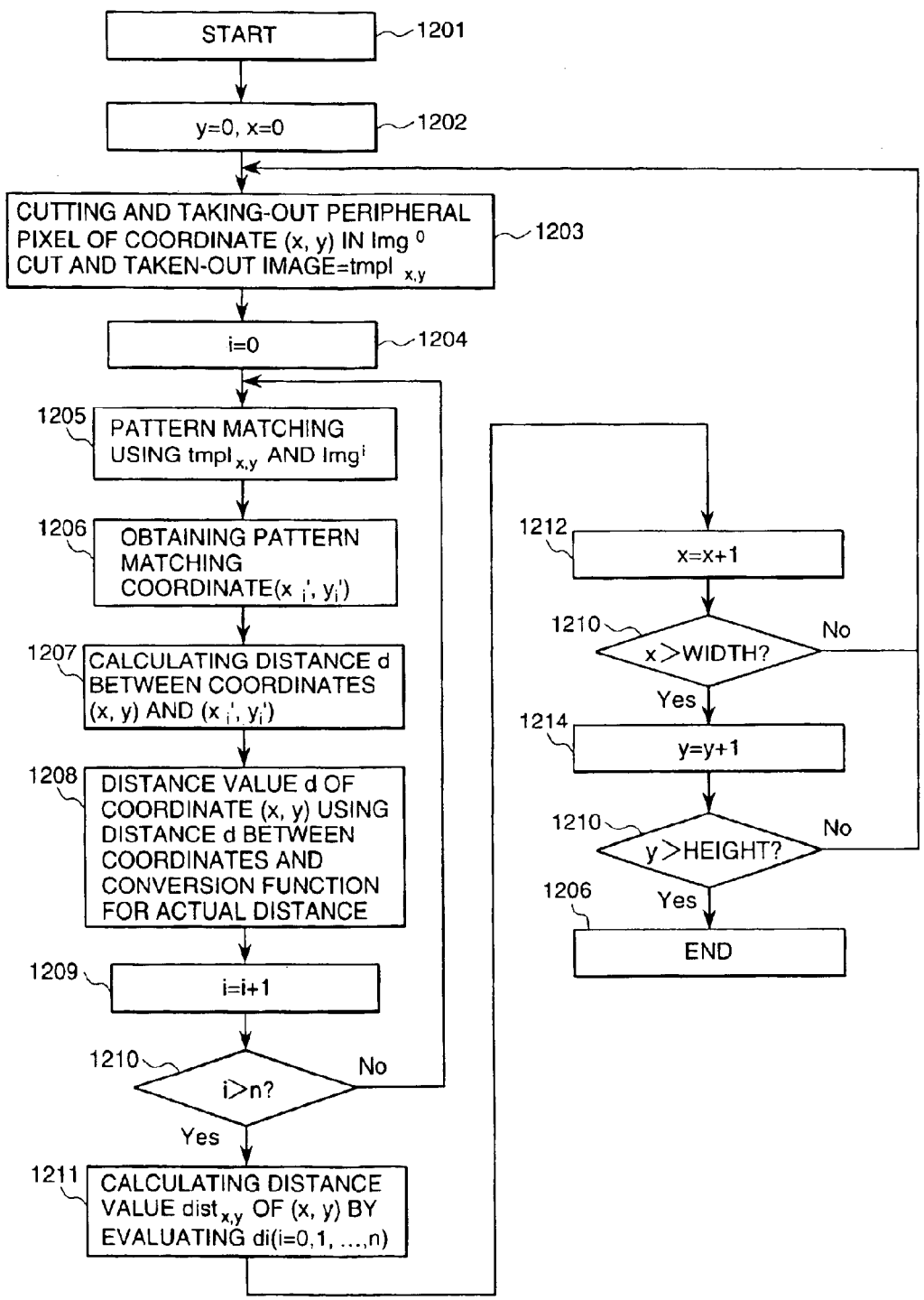
FIG. 7 is a flowchart showing the procedure for processing used in the distance calculating part.

FIG. 7 shows the flow of the distance calculating process. This process is executed mainly by the distance calculating part 350. The distance calculating part 350 starts its processing in response to a starting instruction received from the camera control part 310 (Step 1201).

Figure 8A:
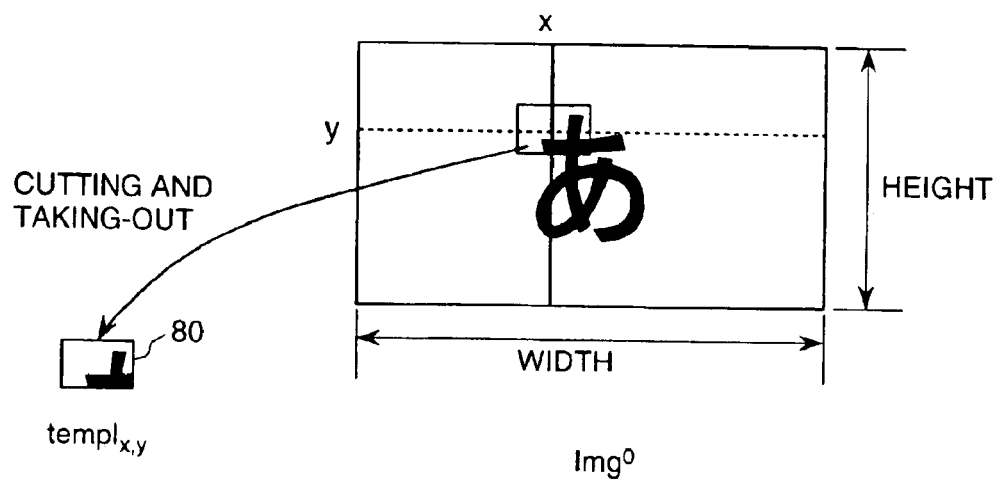
FIG. 8A is a diagram showing an example of image cutting and taking-out processing.

The distance calculating part 350 starts the distance calculation processing initially from the pixel at coordinate (x, y)=(0, 0) (Step 1202). Initially, the cutting and taking-out of an image in the peripheral portion of the coordinate (x, y) of the reference image is executed (Step 1203). This processing operates to cut and take out an image in the peripheral portion of a target pixel (x, y) as a template image 80, as shown in FIG. 8A. The pixel size of the cut and taken-out image varies depending on the pixel size of the input image. Therefore, an experiment is conducted in advance to determine that pixel size which is small in matching miss at the time of pattern matching to be performed later and is as small as possible.

Figure 8B:
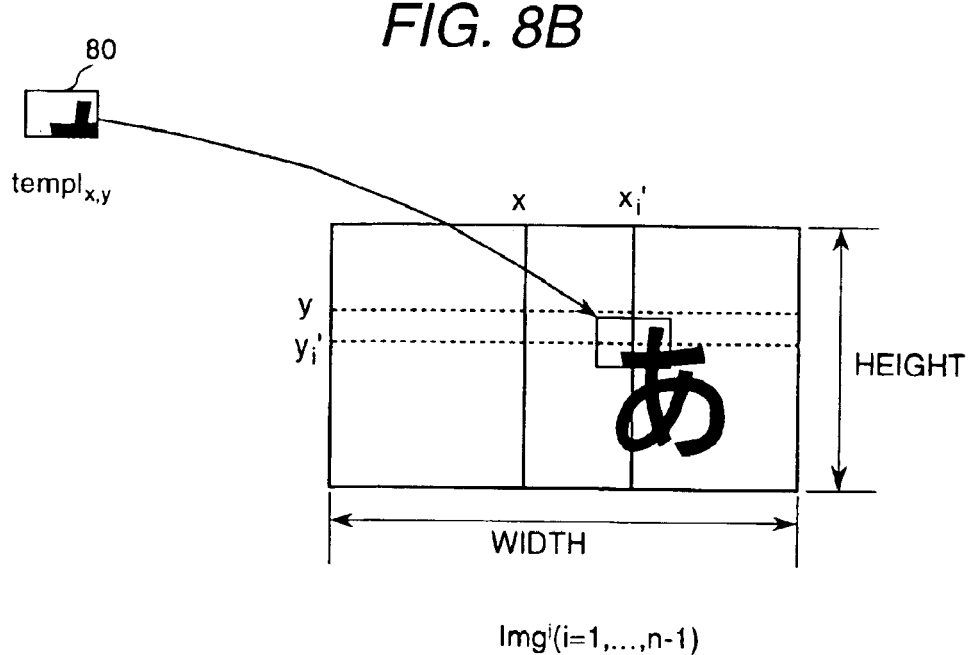
FIG. 8B is a diagram showing an example of the pattern matching processing executed by using the cut-and-taken-out image.

Next, a pattern matching process is performed using the template image 80 and the image $Img^i$ (i=1, 2, ..., n−1) (Step 1205). This processing is carried out to perform an image search using pattern matching to determine ni which part of the read-in image $Img^i$ (i=1, 2, ..., n−1), other than the reference image, the template image 80 exists, as shown in FIG. 8B. The pattern matching method generally reported in the textbooks on image processing can be employed for this pattern matching process, and, accordingly, it is easy to realize such pattern matching processing. By this processing, it is possible to determine in which part of the read-in image $Img^i$ (i=1, 2, ..., n−1) the template image 80 exists. Thus, a coordinate (x', y') where the two images match can be obtained (Step 1206).

The number of pixels between the two coordinate positions (x, y) and (x', y') is obtained as a displacement of the target pixel (x, y). Here, since the phenomenon is observed as if the image moved on the pixel plane of the imaging element, the displacement may be referred to as a pixel moving amount. This amount is defined as d.

As the method of obtaining the number of pixels between coordinate positions, the Euclid distance between two coordinates, shown below, is used.

$$d = \sqrt{(x-x')^2 + (y-y')^2} \qquad (3)$$

A distance value $d_i$ from the pixel (x, y) is calculated from the obtained displacement d using the pre-given conversion equation of the displacement and the distance value (Step 1208).

By performing the above operation for all pixels in the image, a distance value for each pixel is obtained. Further, since the volume of the calculation becomes large in a case where the calculation is performed on all of the pixels of the total image, it is possible to shorten the processing time by calculating only the coordinates of parts necessary for determining the distance values and by performing approximate processing on the remaining pixels.

As another embodiment of the present invention, an example will be described which makes use of a non-contact scanner, to which the image input apparatus having the distance measurement function in accordance with the present invention is applied.

The non-contact scanner is advantageous because there is less limitation at setting originals compared to the conventional products, such as a flat head scanner and a sheet scanner. That is, the conventional scanner requires operations for turning over the original, making the original pass through the sheet feeder etc. However, the non-contact scanner does not require these operations. It is sufficient to simply place the original on the original table; and, accordingly, the non-contact scanner has a large advantage with regard to ease of handling, which the conventional products do not have.

However, in the case where an image is taken in by the user simply putting the original on the original table, there is a disadvantage in that the images of letters, a picture and a photograph in the original read by the camera are largely deformed when the original has an unevenness, such as a wrinkle, a fold, a bend or the like.

The image input apparatus having the distance measurement function in accordance with the present invention can acquire both images and distance information. Therefore, when the image input apparatus having the distance measurement function in accordance with the present invention is used as a camera for image inputting, a deformation of the image can be corrected. That is, the non-contact scanner in accordance with the present invention can provide an apparatus that is capable of making less deformed images, similar to the conventional flat head scanner, the conventional sheet scanner and the like, while maintaining the ease of use, which is an advantage of the non-contact scanner.

Figure 11A:
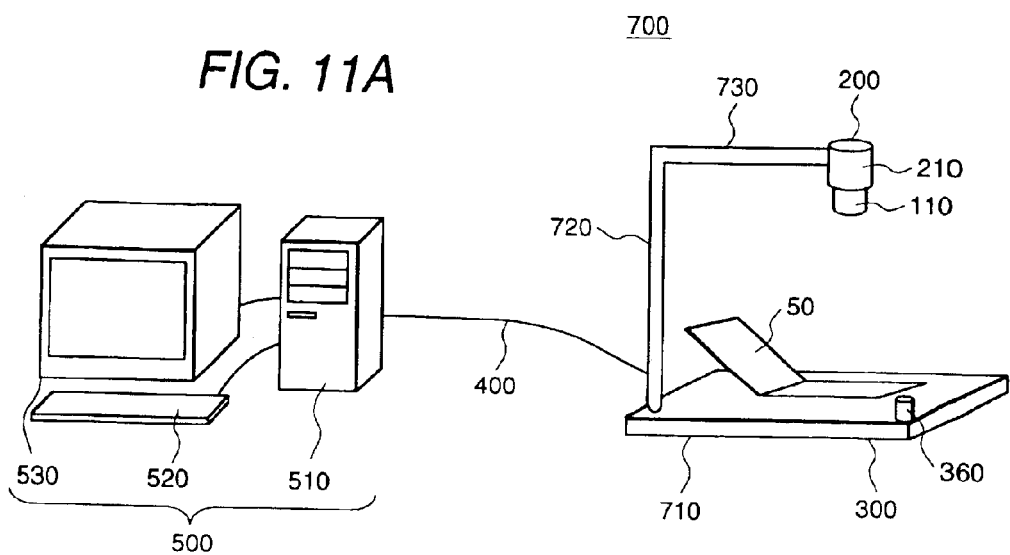
FIG. 11A is a perspective view showing the composition of a non-contact scanner.

FIG. 11A is a perspective view showing a non-contact scanner having an image deformation correcting function, to which the image input apparatus having the distance measurement function in accordance with the present invention is applied.

The scanner 700 shown in FIG. 11A comprises an original table 710; a support column 720 mounted on the original table 710; an arm 730 projecting from the support column 720 toward the area above the original table 710; a camera 200 supported by the arm 730; and an image input control unit 300 contained in the original table 710. A reading start button 360 is arranged in an externally exposed state on a portion of the original table 710.

The camera 200 is supported by the arm 730 and is arranged at a position where it is capable of seeing almost the whole upper surface of the original table from above the original table 710. A lens system 210 and a mask 110 of the light passing position restricting unit 100 are mounted onto the object side of the camera 200. It should be understood that the present invention is not limited to the mask 110.

The image input control unit 300 contained in the original table 710 is connected to a computer 510 forming part of an information system 500 through an information transmitting medium 400, for example, a cable, which is used to send the acquired image information together with the distance information to the computer 510. An input unit 520 for generating inputs, such as instructions, and a display unit 530 for displaying images are connected to the computer 510.

Figure 12:
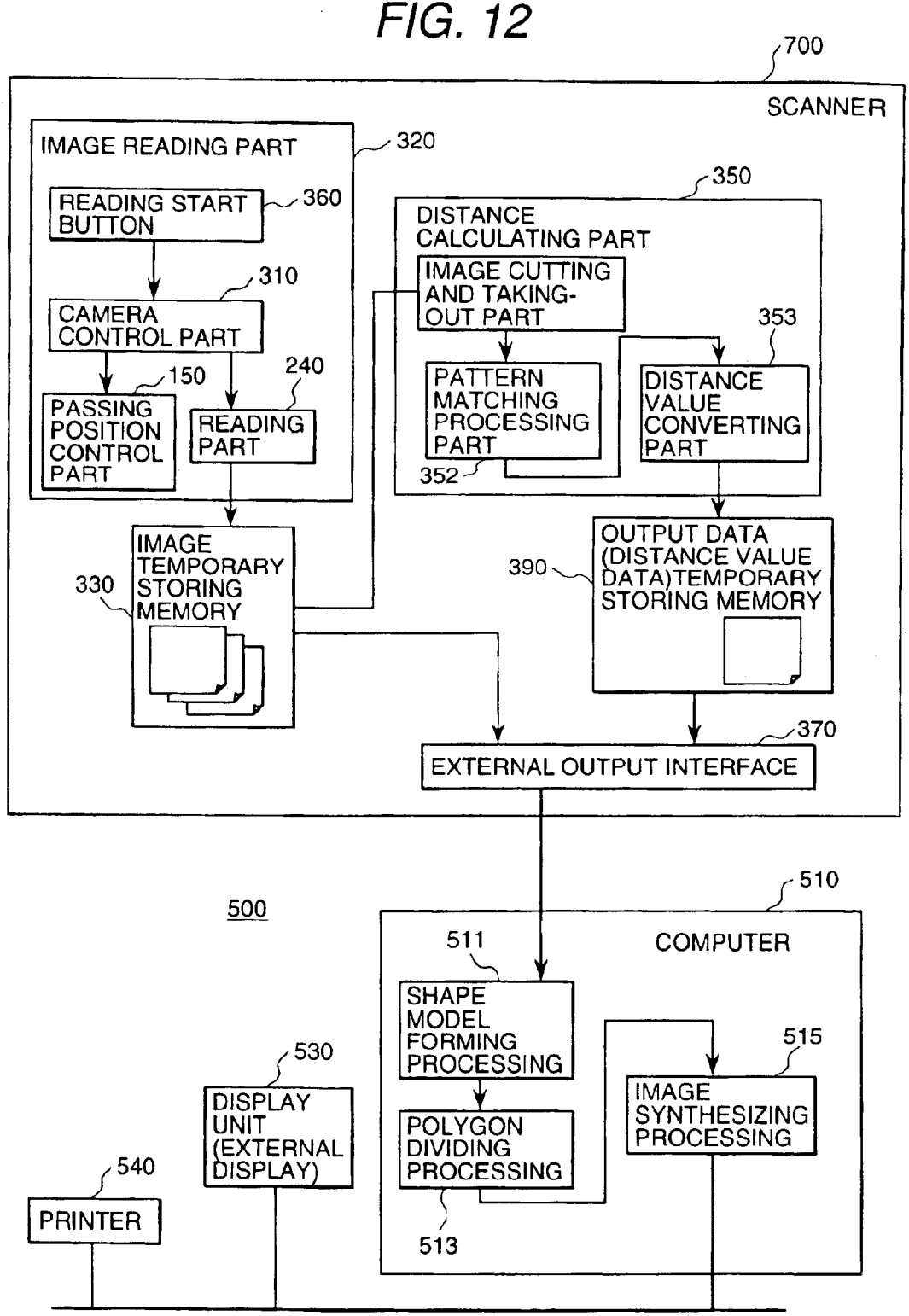
FIG. 12 is a block diagram showing the functional structure of a non-contact scanner having an image deformation correction function.

FIG. 12 is a block diagram showing the functional structure of the non-contact scanner having an image deformation correction function. The scanner 700 shown in FIG. 12 is roughly composed of an optical system part of the camera, not shown; an image read-in part 320; a distance calculating part 350; an image temporary memory 330; an output data temporary memory 390; and an external output interface 370.

The function of the image read-in part 320 can be realized by a reading part composed of the reading start button 360; the camera control part 310; the passing position control part 150; and the CCD 240 and so on. The image read in by the image read-in part 320 is transmitted to the image temporary memory 330 so as to be stored in the memory 330. The distance calculating part 350 has an image cutting-and-taking-out part 351; a pattern matching processing part 352; and a distance converting part 353 as the function. The distance information calculated by the distance calculating part 350 is transmitted to the output temporary memory 390 so as to be temporarily stored in the memory 390. After completion of the distance calculation, the image and the distance information are transmitted to an external unit, such as the computer 510 of the information processing system 500 through the external output interface 370, when an instruction which calls for data reading out is received from the outside through the external output interface 370.

Each of the functions performed in the scanner described above is similar to the respective functions of the image input apparatus having the distance measurement function in accordance with the present invention. In addition, the contents of each processing are also similar to those of the image input apparatus having the distance measurement function. Further, it is possible for the processing of the distance calculating part 350 to be executed by an external unit (a computer) using software, and the scanner main body is composed of only the image reading part and the output interface. In this case, an equivalent scanner can be provided by adding the opening position control part and the opening shape variable masks to a reading part of a conventional scanner. Therefore, there is an advantage in that a commercial scanner can be effectively used.

The images and the distance information output from the scanner 700 are transmitted to the computer 510. The received images and the received distance information are processed by the computer 510 using software so as to output images in which a deformation in the image is corrected. As an example of the functions realized by processing using software by the computer 510, there are shape model forming processing 511 for modeling the shapes of a fold and a bend in the original based on the distance information; polygon dividing processing 513 for executing polygon dividing of the read-in image according to the shape model in order to correct the deformation; and image synthesizing processing 515 for generating a deformation-corrected image using the technology of texture mapping of the image by means of divided polygons. The computer 510 can output the deformation-corrected image to the display unit 530 and the printer 540. Thus, an image having less deformation is output to the display unit 530 and the printer 540.

Further, in the example shown in FIG. 11A, a wireless means, such as Bluetooth, may be used for transmitting the image. By doing so, the need for cables is eliminated, so as to increase the degree of freedom in setting up the installation. Accordingly, the usability of the system can be improved. Further, the image input control unit 300 and the reading start button 360 can be integrated into the camera 200 to form a unit. By constructing such a unit, the unit can be used by removing the unit from the support column; and, accordingly, it can be used by attaching the scanner onto an edge of a desk or a wall, which further improves the usability of the system.

The operation of the scanner will be described below. Here, it is assumed that scanning of an original is performed in a state in which the original 50 is mounted on the original table 710.

In the operation of the scanner, the image input control unit 300 receives an instruction for the start of reading when the reading start button 360 is actuated, and an image is taken in using the camera 200. As described previously, the image input control unit 300 causes light from the original 50 to pass through the different light passing positions using the respective masks 110 so as to project light on the image forming plane of the imaging element of the camera 200. It then detects a displacement on the image forming plane between the received images, and obtains a distance of the object corresponding to the detected displacement from information representing a one-to-one correspondence between the distance of the object and the displacement. Then, the distance information is output to the computer 510, together with the image of the original that has been acquired using the camera 200. The computer 510 corrects for any deformation of the image information caused by unevenness of the original using the distance information, among signals input from the image input control unit 300.

Figure 11B:
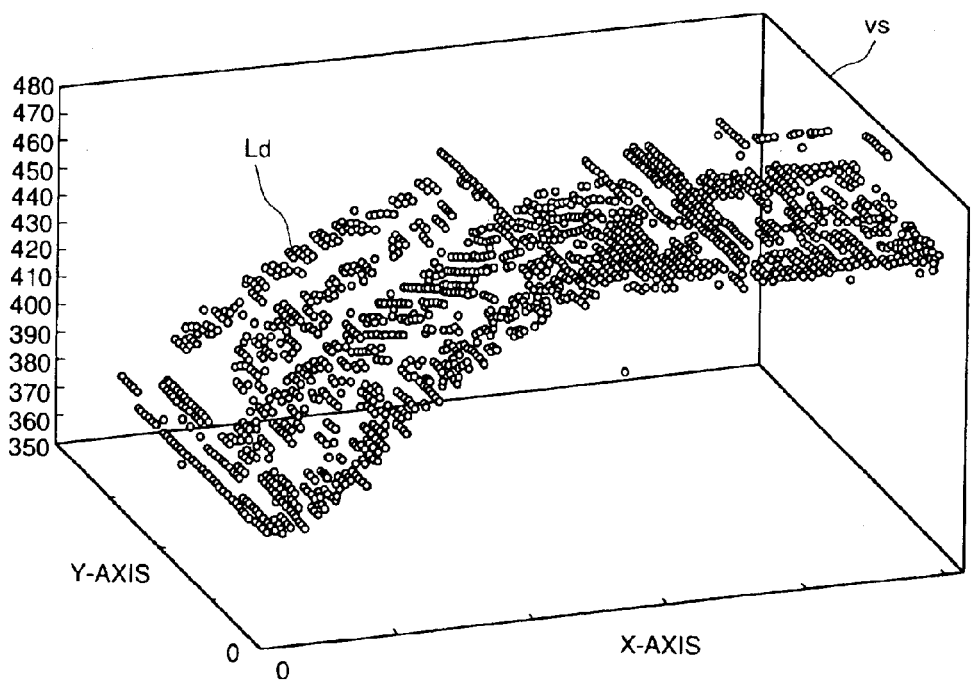
FIG. 11B is a graph showing a three-dimensional distribution of original plane positions measured by the scanner.

FIG. 11B is a graph which visually illustrates a distance distribution state Ld of each point of the original 50 by plotting the measured result of distances in a virtual three-dimensional space above the original table. In FIG. 11A, the original 50, which is folded in a bent state with one end partially rising, is placed on the original table 310. Therefore, as shown in the virtual space of FIG. 11B, the points in the region corresponding to the part mounted flat on the original table 360 are distributed on a level of a constant distance from the camera. On the other hand, it can be understood that the points of the original 50 in the region corresponding to the rising part have a progressively similar distance from the camera toward the edge of the original 50 from the folded position. This visual state may be also obtained by processing the distance information using the computer 510. The processed result can be shown in the state of, for example, FIG. 11B as a display on the display unit 530.

As described above, in the non-contact scanner to which the present invention is applied, information showing the distance distribution of an object from the camera can be acquired. Therefore, it is possible for the image of an object having an uneven surface to be corrected so as to provide an image in a flat state using the distance distribution information. In the case of FIG. 11B, the image of the original can be corrected to represent a flat state by correcting the pixels in the inclined region extending from the folded line portion of the object.

The deformation correcting processing performed by the computer 510 will be described below with reference to FIG. 13A to FIG. 14.

Figure 13A:
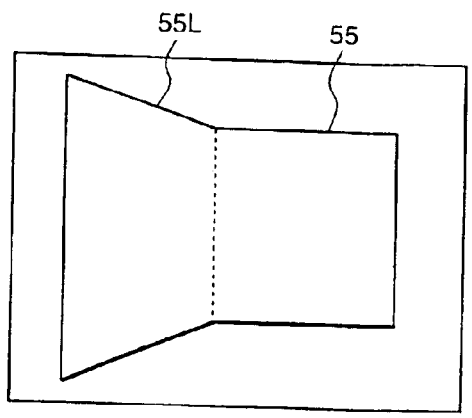
FIG. 13A to FIG. 13D are diagrams schematically showing an outline of the process of correcting the image deformation of an object extracted by the scanner.
Figure 13B:
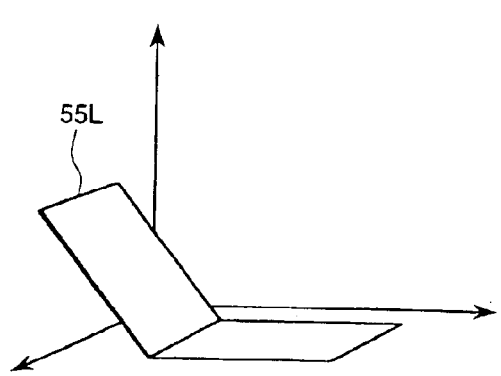
Figure 13C:
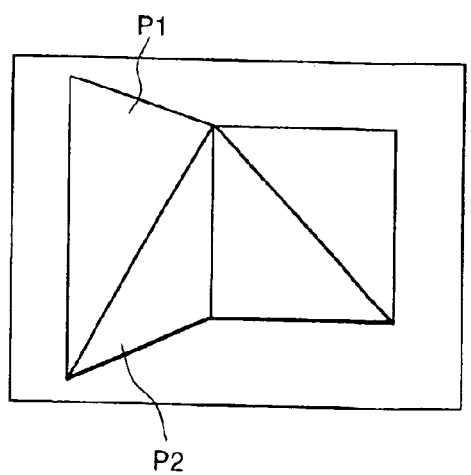
Figure 13D:
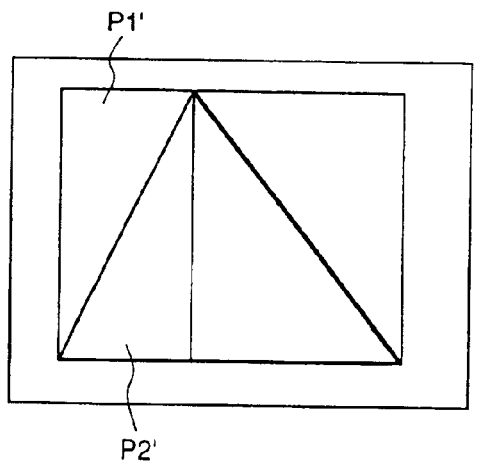

FIG. 13A is a top view showing an example of an image obtained by taking a picture of an original which is folded so as to have a flat portion and a partially rising portion. As shown in FIG. 13A, the shape of the left side 55L of the image of the original 55 is seen as being deformed though the shape of this part 55L should be seen as a part of the overall rectangular shape of the image. Therefore, the information carrying the distance between the camera and each point of the original is acquired, together with inputting of the image, using the scanner in accordance with the present invention. As shown in FIG. 13B, the shape of the original can be plotted in three-dimensional space. The image of that part of the original rising from the original table is divided into triangular polygons corresponding to the change of distance, based on the three-dimensional information. In regard to the polygon dividing method, a software program for executing polygon dividing using three-dimensional point group data is commercially available. Therefore, the polygon dividing can be executed using such a software program. As a result, in the case of FIG. 13C, the image of the inclined part of the original can be divided into two triangular polygons P1 and P2. As shown in FIG. 13D, an image without deformation can be obtained by converting the divided polygons P1 and P2 to normal polygon shapes without deformation using the texture mapping processing of computer graphics technology and by synthesizing the images using an image mapping operation.

Figure 14:
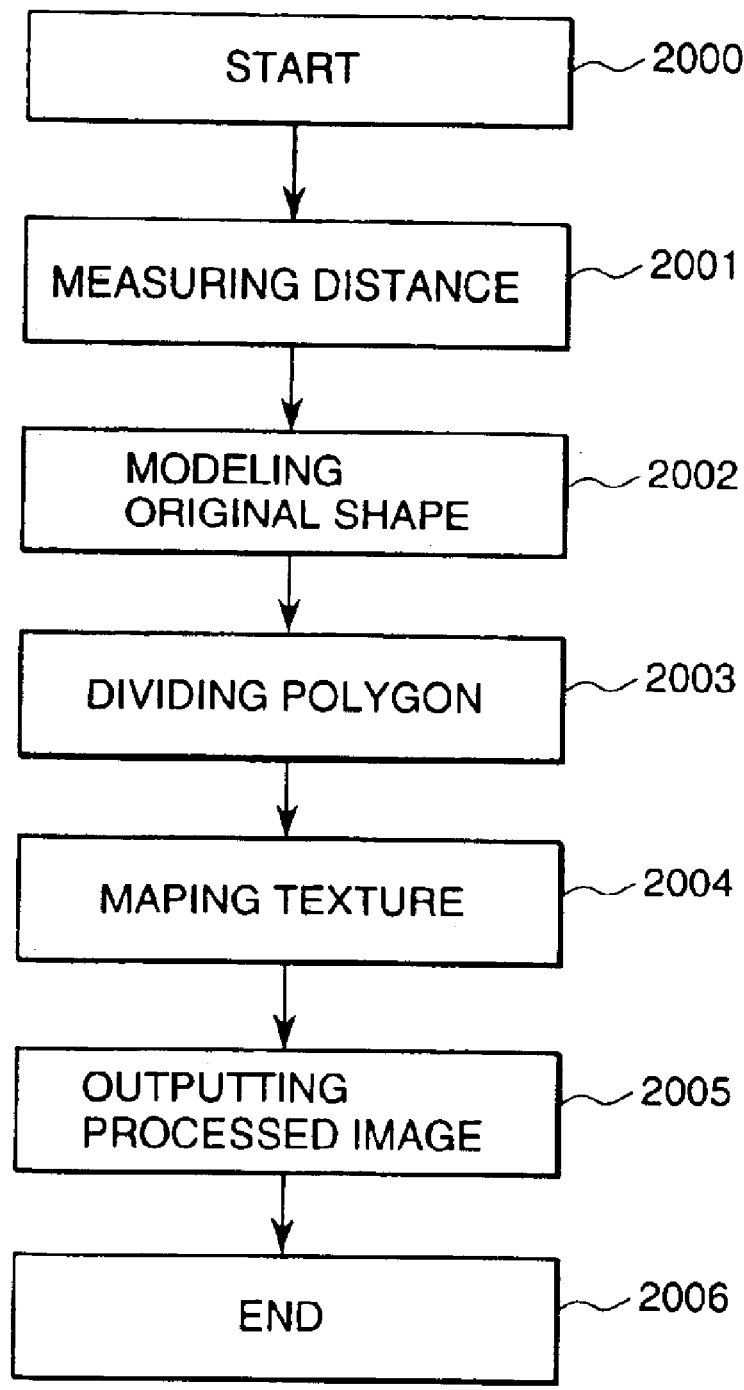
FIG. 14 is a flowchart showing the procedure of deformation correction processing.

FIG. 14 is a flowchart showing the procedure for deformation correction processing based on distance measurement. After the start (Step 2000) of processing, a distance measurement is executed according to the processing employed in the above-described image input apparatus in accordance with the present invention (Step 2001). Thus, the distance information is acquired. Modeling of the shape of the original is then executed based on the acquired distance information (Step 2002). The distance measurement between the original 50 and the camera 200 (the center of the lens system or the image element) is performed, and information representing the distance between each point of the original and the camera (the lens system or the image element) is obtained. From this, the fold and bend information of the original is modeled. The polygon dividing of the image of the original is then carried out based on the modeled information (Step 2003). The texture mapping for all the divided polygons is executed (Step 2004), and the texture-mapping processed image is output (Step 2005). Thus, the processing is completed (Step 2006).

Although the example shown FIGS. 13A to 13D is relates to an original in a folded and bent state, the non-contact scanner to which the present invention is applied can cope with a case of a gently folded original or an overall uneven original. That is, the non-contact scanner can cope with the state of any original, if the image can be acquired.

Another example of a mask used for the light passing position restriction will be described below.

Figure 3A:
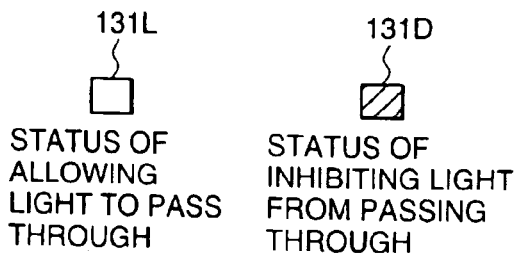
FIG. 3A is a diagram showing two liquid crystal cells, one in a state where it allows light to pass therethrough, and the other in a state where it inhibits light from passing therethrough.
Figure 3B:
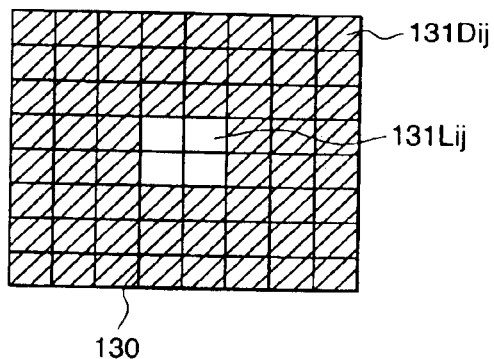
FIG. 3B is a diagram showing an example of a mask which is formed using liquid crystal display elements.
Figure 3C:
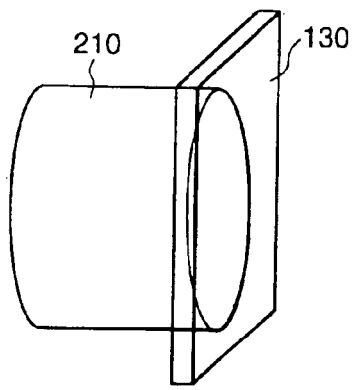
FIG. 3C is a diagram showing a mask panel attached to a lens system of a camera.

FIG. 3A and FIG. 3B show an example of a light passing position restricting member using a liquid crystal panel. As shown in FIG. 3C, the liquid crystal panel 130 is attached at a position, for example, in front of the lens system 210 of the camera. The size and the resolution of the liquid crystal panel can be determined so as to correspond with the lens system 210 being used. Therein, the size and the resolution sometimes need to be changed depending on the attaching position. The attaching position is not limited to the position shown in FIG. 3C, if optically possible. For example, the light passing position restricting member can be attached at a conjugate position. As shown in FIG. 3C, the liquid crystal panel 130 is attached to the front face of the lens system so closely that light may not enter through any gap.

The liquid crystal panel 130 is constructed of a plurality of cells $131_{ij}$ arranged in the form of a matrix. The cells $131_{ij}$ are individually supplied with a voltage so as to be in a status of allowing light to pass through or in a status of inhibiting light from passing through, as shown in FIG. 3A. By making use of this characteristic, the light passing position can be set at an arbitrary position by controlling a cell of the liquid crystal panel at an arbitrary address among the cells which make up the matrix so as to place selected cells in the light passing status. The control technology generally used in a conventional liquid crystal display can cope with the control used for establishing which position is brought into a light passing status.

In the case of using a liquid crystal panel, there is an advantage in that a one-to-one correspondence between the light passing position and the measured data can be easily and automatically obtained during measurement, because an arbitrary position can be electrically placed in the light passing state. Further, there is an advantage in that the area of the opening part and the opening shape of the light passing position can be arbitrarily changed corresponding to an instruction. By selecting the opening position, the opening shape and the opening area, the optimum distance measurement can be performed corresponding to the optical characteristic of the object.

According to the present invention, measurement of the distance to an object can be stably and accurately performed without any highly accurate focus control mechanism.

What is claimed is:

1. A distance measuring apparatus for measuring a distance from an imaging element to an object by optically forming an image of the object on the imaging element through a lens to image the object electronically, comprising:
   a plurality of light masking members which each have a light passing opening, the light passing openings being different in position from each other and being capable of being arranged in turn between the object and the lens;
   means for passing light from an object to be distance-measured through the openings of the plurality of sets of light masking members to project images of the object to be distance-measured onto the imaging element;
   means for detecting amounts of displacement of the projected images on the imaging element; and
   means for obtaining a distance of the object to be distance-measured on the basis of the detected amounts of displacement.

2. A distance measuring apparatus as claimed in claim 1, wherein the plurality of light masking members are a plurality of aperture plates which each have at least one hole as the light passing opening thereof.

3. A distance measuring apparatus as claimed in claim 1, wherein the plurality of light masking members are provided by a liquid crystal panel having a plurality of selectable cells, where cells are selected being different in position from each other to effect differing light masking members in turn.

4. A distance measuring apparatus as claimed in claim 1, wherein the light passing openings are arranged at differing timings between the object and the lens.

5. A distance measuring apparatus as claimed in claim 1, wherein the light passing openings are arranged sequentially between the object and the lens.

6. A distance measuring method of measuring a distance from an imaging element to an object by optically taking in an image thereof by the imaging element, comprising:
   preparing a plurality of light masking members which each have a light passing opening, the light passing openings being different in position from each other;
   preparing a displacement-to-distance conversion equation obtained from information indicating a correspondence relationship between distance values from the object to the imaging element and amounts of displacement of the object;
   passing light from an object to be distance-measured through the openings of the plurality of light masking members in turn to project images of the object to be distance-measured to an image farming plane of the imaging element;
   detecting amounts of displacement of the projected images on the image forming plane; and
   obtaining a distance to the object to be distance-measured by substituting the detected amounts of displacement into the displacement-to-distance conversion equation.

7. A distance measuring method as claimed in claim 6, wherein the plurality of light masking members are a plurality of aperture plates which each have at least one hole as the light passing opening thereof.

8. A distance measuring method as claimed in claim 6, wherein the plurality of light masking members are provided by a liquid crystal panel having a plurality of selectable cells, where cells are selected being different in position from each other to effect differing light masking members in turn.

9. A distance measuring method as claimed in claim 6, wherein the light passing openings are arranged at differing timings between the object and the lens.

10. A distance measuring method as claimed in claim 6, wherein the light passing openings are arranged sequentially between the object and the lens.

* * * * *